Feb. 12, 1946.  M. GOODMAN  2,394,854
STEERING APPARATUS
Filed May 11, 1944  2 Sheets-Sheet 2
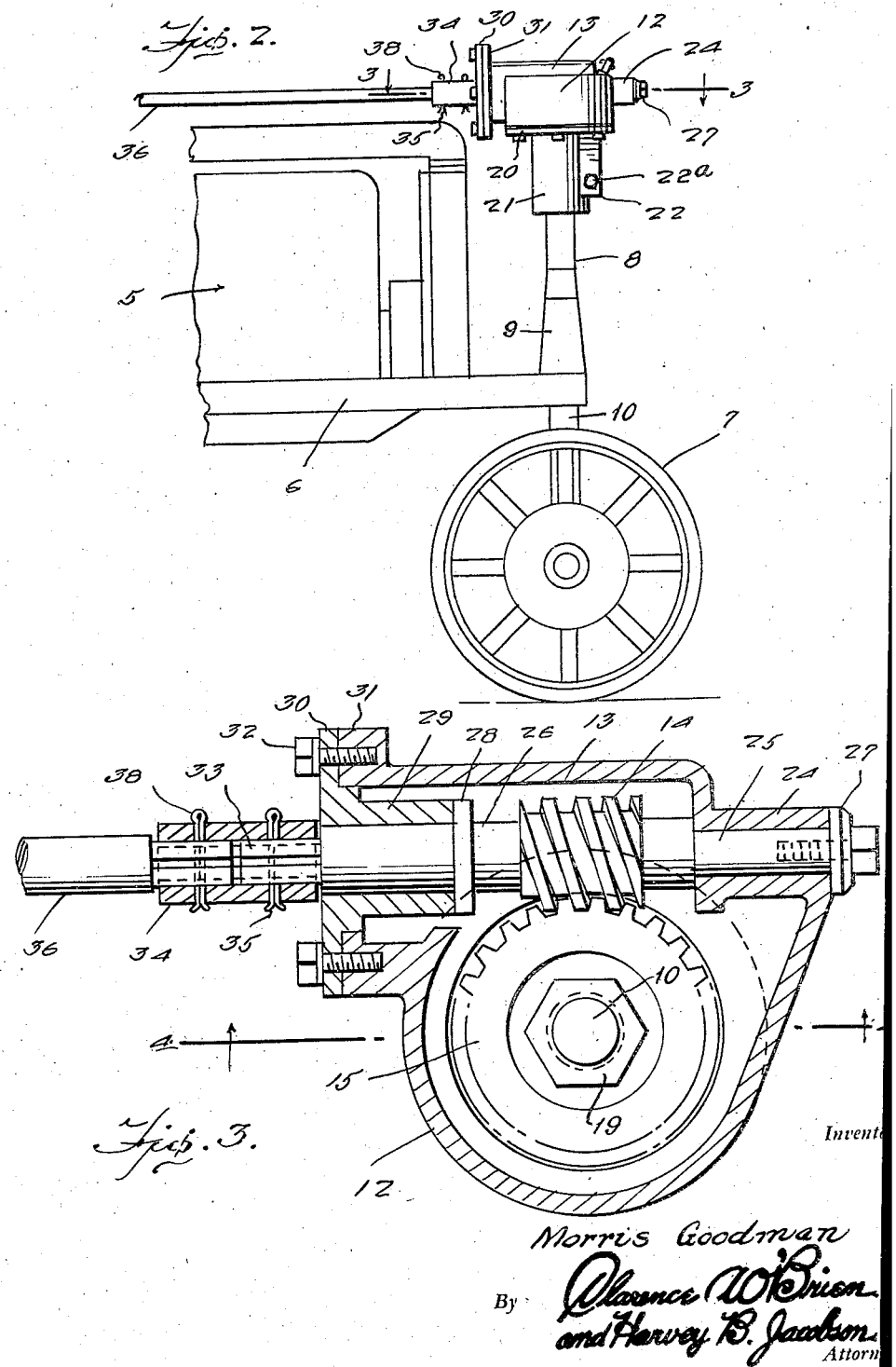

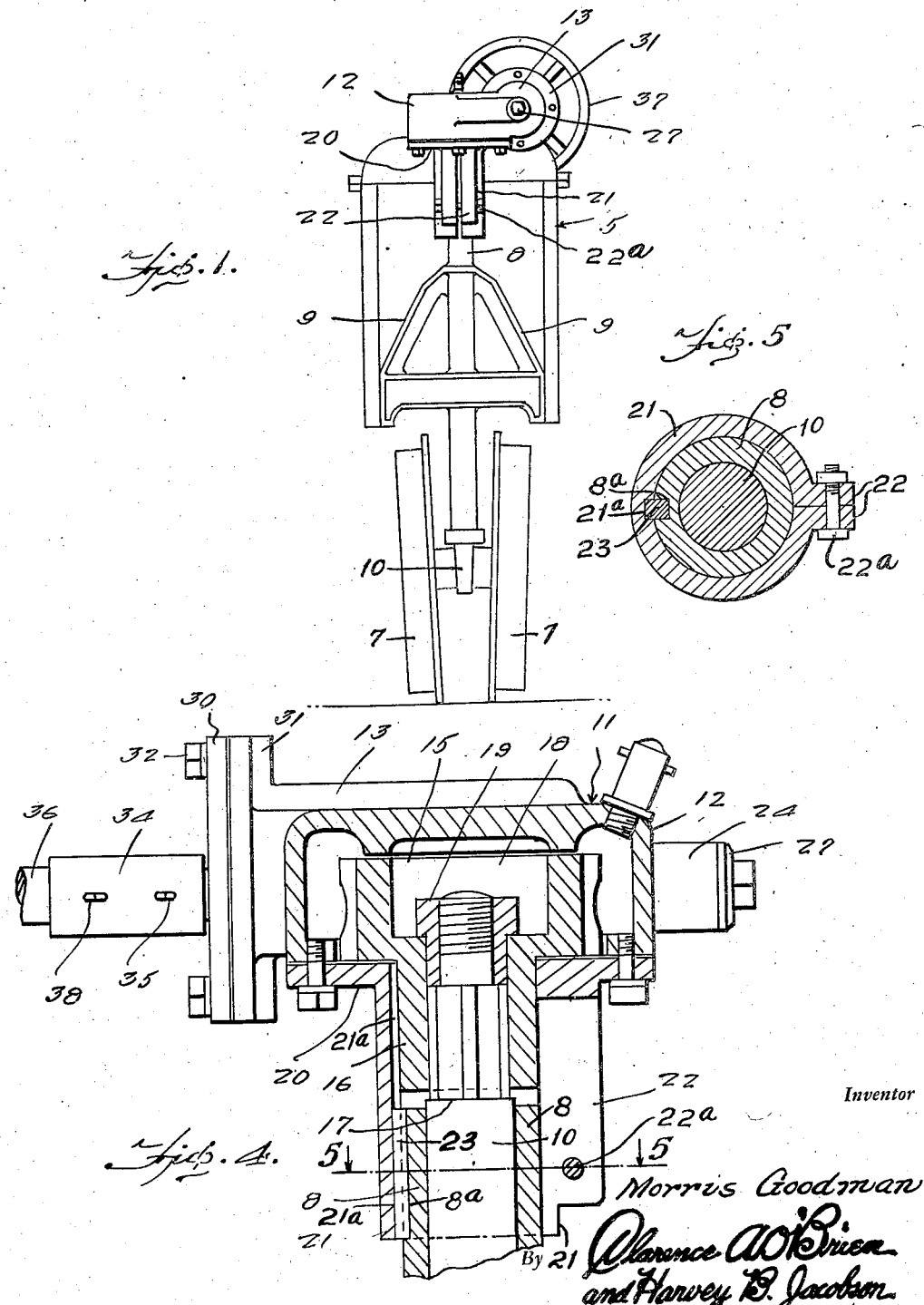

Patented Feb. 12, 1946

2,394,854

UNITED STATES PATENT OFFICE 2,394,854

STEERING APPARATUS

Morris Goodman, Lincoln, Nebr.

Application May 11, 1944, Serial No. 535,094

1 Claim. (Cl. 280—92)

This invention relates to new and useful improvements in steering mechanisms, especially adapted for use on tractors of a well-known construction which are equipped with an open-type steering apparatus which is both dangerous and difficult to operate.

Manufacturers are now producing a closed type steering apparatus for installation on tractors in substitution for the open type, but in switching from the open type to the closed type, it is necessary with this substitute apparatus to replace a number of parts including the original bolster.

The principal object of the present invention is to provide a substitute closure type steering apparatus for tractors of a well-known construction which replaces a few parts of the conventional open type steering apparatus and which can be mounted directly on the old bolster.

Other objects and advantages of the invention will become apparent to the reader of the following description.

In the drawings:

Figure 1 represents a front elevational view showing the substitute steering apparatus mounted upon the conventional bolster.

Figure 2 is a fragmentary side elevational view showing the substitute steering apparatus mounted upon the conventional bolster.

Figure 3 is an enlarged horizontal sectional view taken substantially on the line 3—3 of Figure 2.

Figure 4 is an enlarged fragmentary vertical sectional view taken substantially on the line 4—4 of Figure 3.

Figure 5 is a transverse sectional view taken along line 5—5 of Fig. 4.

Referring to the drawings wherein like numerals designate like parts, it can be seen that numeral 5 generally refers to a conventional tractor having the usual chassis 6 and front steerable wheels 7. On the forward end of the chassis 6 is an upright bolster 8, the same being of conventional construction and including brace means 9. Vertically through the bolster 8 extends the usual shaft or post 10 on the lower end of which are mounted the wheels 7.

Numeral 11 generally refers to the improved enclosed substitute steering mechanism, the same consisting of a substantially circular housing portion 12 and a tangentially disposed horizontal barrel portion 13, these portions going together to make up a gear housing for containing a worm 14 and a worm gear 15, the gear 15 having a depending sleeve portion 16 which surrounds the upper portion of the shaft 10 above shoulder 17 and is keyed to the upper portion of the bolster so that the shaft turns with the worm gear. The shaft or post 10 has its upper reduced portion disposed upwardly in the sleeve 16 and terminating within a pocket 18 in the gear 15 where it is equipped with a gear retaining nut 19.

The bottom of the circular housing 12 is defined by an outstanding flange 20 on the upper end of a depending split sleeve 21, the vertical edge portions of which are provided with flanges 22 preferably drawn together by a bolt 22a to a firm clamping engagement with the upper portion of the bolster 8. The sleeve 16 can turn in the sleeve 21 but the bolster 8 and the sleeve 21 must be prevented from turning relative to each other when the gear 15 is rotated to turn shaft 10 in the bolster 8. Therefore, the sleeve 21 and the bolster 8 have been formed with registering grooves 21a and 8a into which a key 23 is driven. This key very effectively prevents the bolster 8 from turning with the shaft 10 but since the sleeve 16 is keyed to the reduced upper portion of shaft 10 and may turn in the sleeve 21 steering movement will be imparted to the shaft 10 and the wheels 7 when the gear 15 is turned.

The barrel 13 has a reduced tubular extension 24 defining a bearing for a reduced extension 25 of the shaft 26 on which the worm 14 is located. This reduced extension 25 is provided with a removable cap screw 27 at its forward end. A thrust collar 28 is provided on the shaft 26 at the opposite side of the gear 14 and this bears against a bearing 29 which is flanged as at 30 and held against a flange 31 on the barrel 13 by machine screws 32.

The rear end of the worm shaft 26 has a reduced extension 33 which is disposed into a coupling 34 and connected thereto by a cotter key or the like 35.

An elongated steering shaft 36 provided with a steering wheel 37 at its rear end, has its forward end reduced and disposed into the opposite end of the coupling 34 where it is held by a cotter key or the like 38.

Thus it can be seen, that without replacing the bolster 8 or the shaft 10, the enclosed type of gear mechanism can be substituted on a tractor of conventional construction in place of the open type with but a minimum exercise of effort.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a motor vehicle including a frame, a tubular bolster mounted vertically at the front of said frame, a front wheel unit having an upwardly extending post rotatably mounted through said bolster and projecting upwardly therefrom, and a horizontally extending steering shaft, means for operatively connecting the steering shaft with said post comprising a casing open at its bottom and carrying a barrel extending horizontally at one side of the casing and open at its rear end, there being a bearing at the front end of said barrel, a worm gear housed in said casing and having a depending sleeve fitting about the protruding upper end portion of said post and keyed thereto, a nut screwed upon the upper end of said post and holding said worm gear in place thereon, a sleeve about said bolster having an outstanding flange about its upper end secured to said casing in closing relation to the open bottom thereof, the last-mentioned sleeve being split longitudinally and provided with outstanding flanges along its split, a bolt passing through the outstanding flanges and tightened to constrict the last-mentioned sleeve into tight binding engagement with the bolster and provide a loose fit about the sleeve of the worm gear, a bearing fitting in the rear end portion of said barrel and having an outstanding flange removably secured to the rear end of the barrel, a shaft extending longitudinally through said barrel and rotatably mounted in the bearings and provided with a worm meshing with the worm gear and a coupling connecting the rear end of the last-mentioned shaft with the steering shaft.

MORRIS GOODMAN.